United States Patent [19]

Faletti, Jr.

[11] 3,892,324
[45] July 1, 1975

[54] SHUTTLE FORK MECHANISM WITH PROBE MEANS

[75] Inventor: Vincent R. Faletti, Jr., Spring Valley, Ill.

[73] Assignee: Conco Inc., Mendota, Ill.

[22] Filed: Sept. 7, 1973

[21] Appl. No.: 395,633

[52] U.S. Cl. .......................... 214/730; 214/16.4 A
[51] Int. Cl. ............................................... B66f 9/14
[58] Field of Search .......... 214/16.4 R, 16.4 A, 730, 214/731, 1 BB, 1 BT; 200/61.44

[56] References Cited
UNITED STATES PATENTS

| | | | |
|---|---|---|---|
| 2,941,738 | 6/1960 | Burke et al. | 214/16.4 A |
| 3,139,994 | 7/1964 | Chasar | 214/16.4 A |
| 3,232,455 | 2/1966 | Fountain et al. | 214/16.4 A |
| 3,560,678 | 2/1971 | Richardson | 214/16.4 A |
| 3,598,265 | 8/1971 | Aaronson | 214/730 |

Primary Examiner—Robert J. Spar
Assistant Examiner—Lawrence J. Oresky
Attorney, Agent, or Firm—Wegner, Stellman, McCord, Wiles & Wood

[57] ABSTRACT

A shuttle fork mechanism with probe means for detecting obstructions in the path of the shuttle fork wherein the shuttle fork mechanism has a base section, an intermediate section, and a top section, with the top and intermediate sections being in nested relation when in retracted position and being extendable with the top section moving relative to the intermediate section and with a probe member carried at the outer end of the top section which is moved outwardly by interengaging structure operative in relative movement of the top section with respect to the intermediate section to detect any obstruction to the path of movement of the shuttle fork mechanism. Additionally, the probe member may be activated plural times in an extension of the shuttle fork mechanism or deactivated.

18 Claims, 6 Drawing Figures

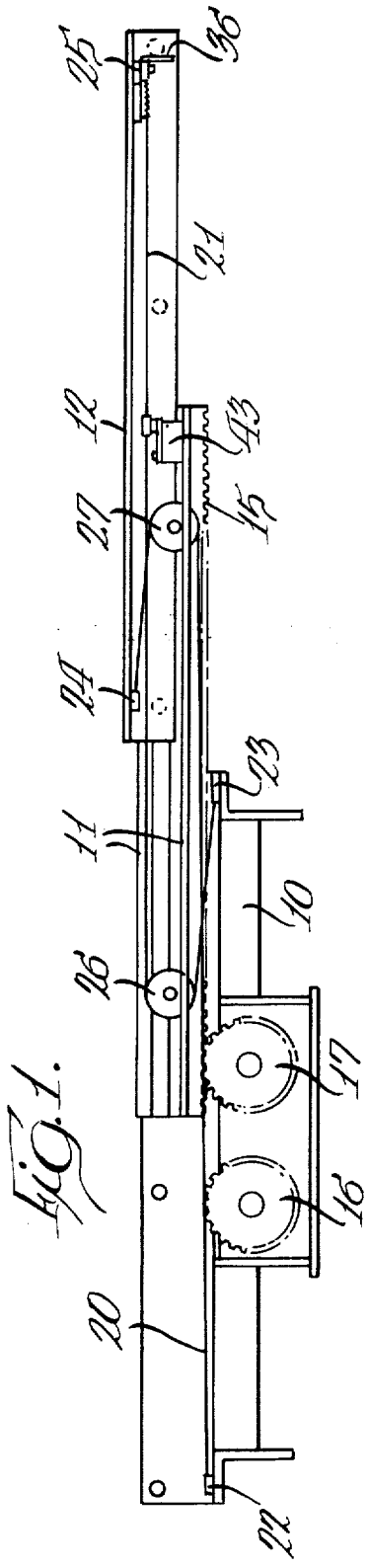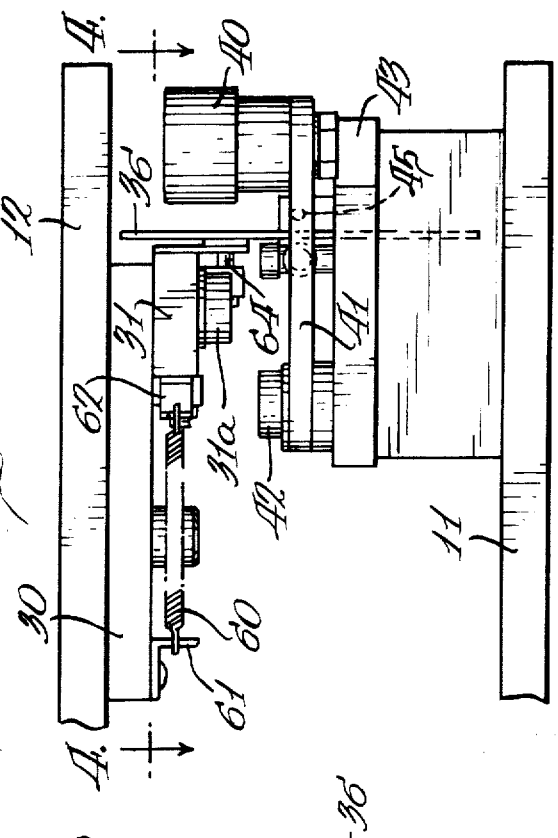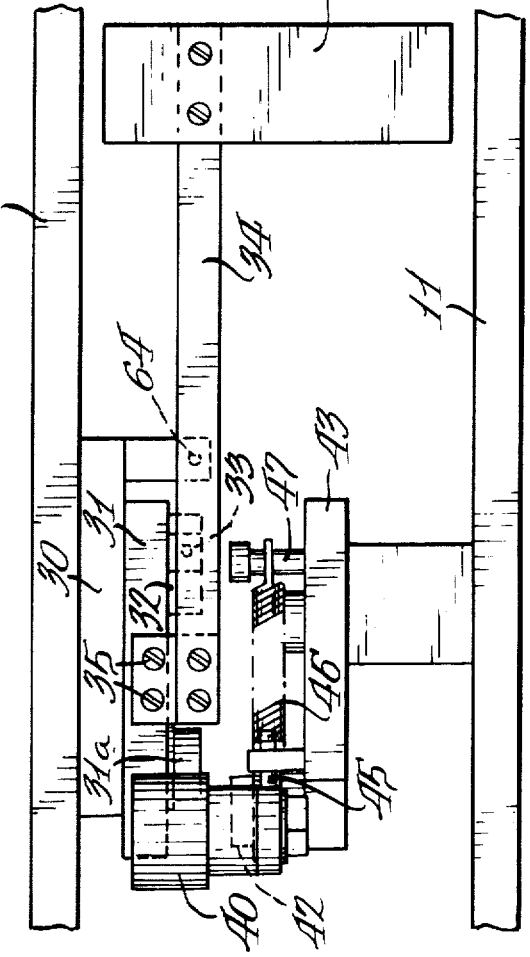

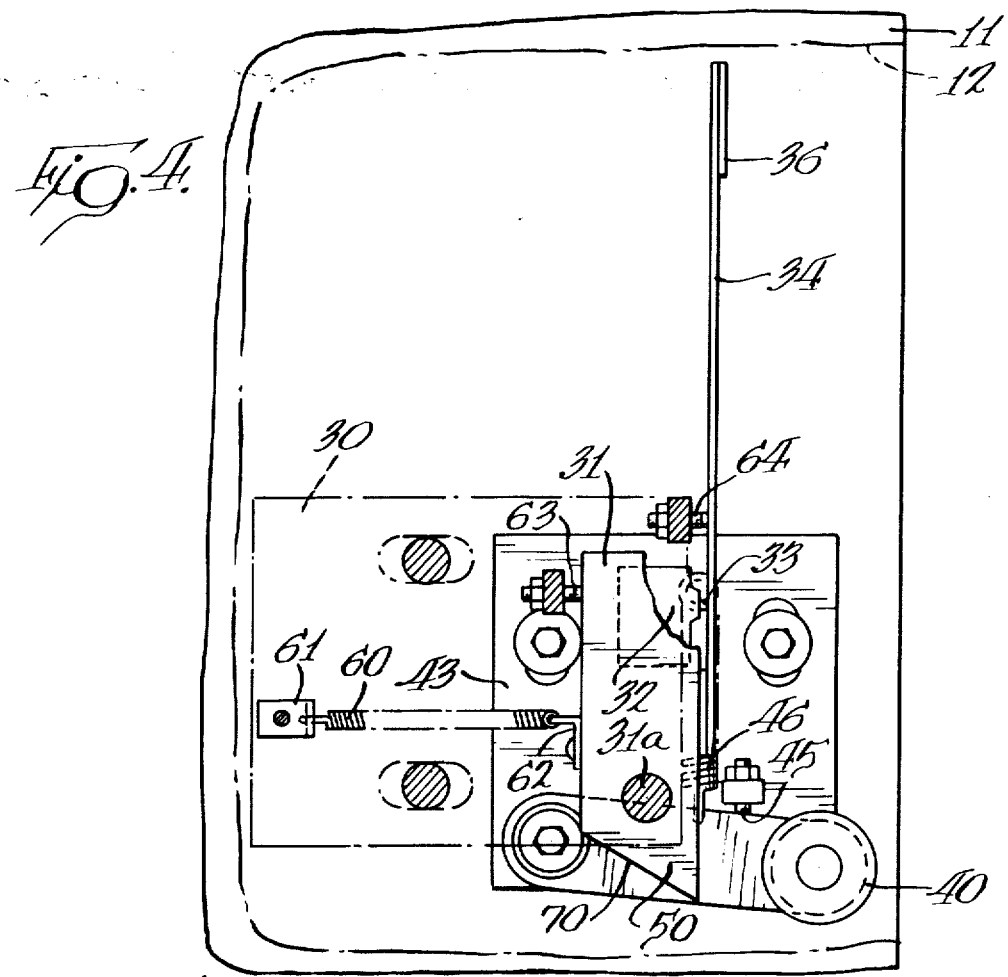
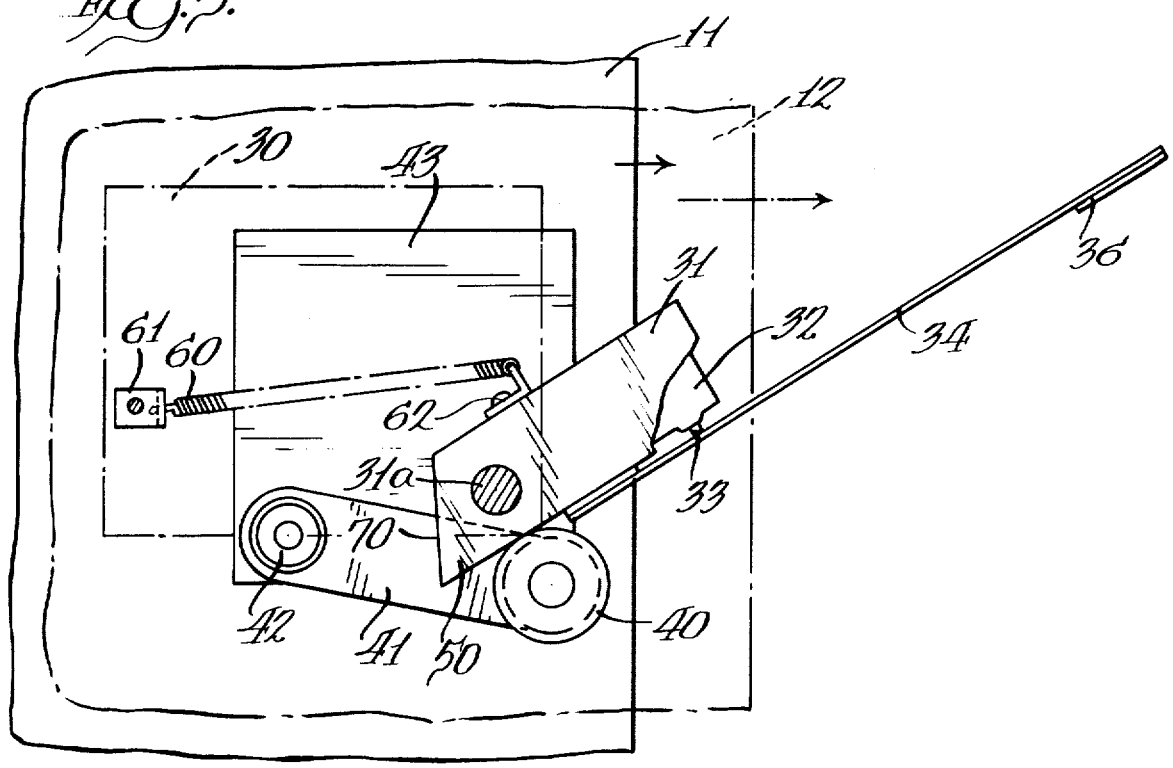

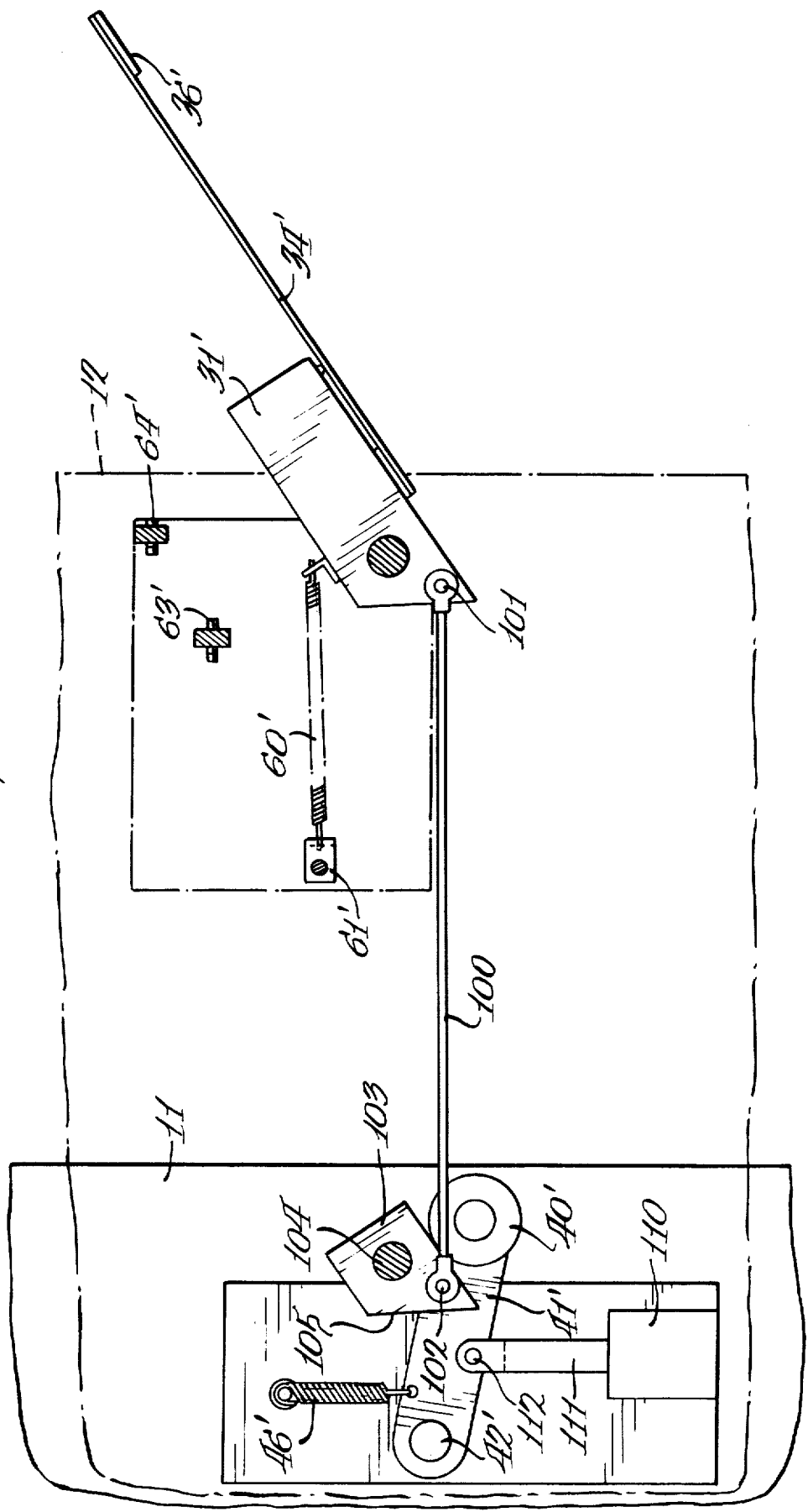

SHUTTLE FORK MECHANISM WITH PROBE MEANS

BACKGROUND OF THE INVENTION

This invention pertains to probe means associated with a shuttle fork mechanism as used in conjunction with insertion and removal of loads from storage racks for detecting any obstruction such as a load in a particular bin of a storage rack prior to movement of the shuttle fork mechanism into the particular rack.

At the present time, many warehousing systems using storage racks and remotely-operated stacker cranes are in existence. With such structures, an operator is not present at the storage rack location where a load is to be inserted into the rack and it is possible to damage the mechanism if, through inadvertence, the shuttle fork mechanism of the stacker crane tries to insert a load into a storage rack already having a load or other obstruction to the advancing movement of the shuttle fork mechanism. Many different systems have been devised to detect an empty bin or rack or absence of an obstruction, including photocell scanning systems and mechanical feelers. The photoelectric scanning systems are expensive and require maintenance for proper operation. Various mechanical systems have complex actuating mechanisms to advance a mechanical probe outwardly into a storage rack and some of these systems have utilized solenoids for extending a probe with there being, therefore, a requirement for additional control circuitry to have the solenoids actuated at the appropriate time to extend the probe.

Desirably, probe means, in retracted position, should be fully within the perimeter of the shuttle fork mechanism so that the stacker crane in travelling along an aisle of storage racks will not have the probe extended for possible engagement with storage rack structure and damage to the probe. With this retracted position of the probe means, it is then important to have the probe become effective as soon as possible in order to detect a possible obstruction before the shuttle fork mechanism has advanced to a position where it could contact the obstruction.

One type of mechanical probe structure is shown in the Aaronson U.S. Pat. No. 3,598,265, wherein a probe member is carried on the intermediate section of a shuttle fork mechanism and is extended upon advance of the shuttle fork mechanism to a detecting position and remains in that position until the shuttle fork mechanism is moved to retracted position. This patent does not show structure wherein the probe means is carried at the outer end of the top section of the shuttle fork mechanism for positioning in the advance of the moving shuttle fork mechanism from a fully retracted position and with the probe means having a sweeping action to detect a possible obstruction in the storage rack.

SUMMARY OF THE INVENTION

A primary feature of the invention disclosed herein is to provide a shuttle fork mechanism with probe means having a retracted position, free of obstruction or contact with structure during movement of the shuttle fork mechanism along the aisle adjacent the storage racks and which is carried by the top section of the fork mechanism for outward positioning in advance of the shuttle fork mechanismm to detect an obstruction in a storage rack and with the probe means being moved outwardly to probe for an obstruction by structure operated by relative movement between the top and intermediate sections of the fork mechanism.

The invention disclosed herein provides for a mechanical probe carried on the top section of a shuttle fork mechanism which is mounted for pivotal movement and is moved by mechanical structure operable upon relative movement between the top and intermediate sections of the fork mechanism whereby no additional controls are required and the probe means is effective upon normal cycle movement of the shuttle fork mechanism.

Furhter, the probe means may be operated plural times in a cycle of extension of the shuttle fork mechanism when there are plural depth loads in a storage rack.

As disclosed herein, the shuttle fork mechanism has a base section with top and intermediate sections in nested relation and retracted position and movable to an extended position with movement of the top section relative to the intermediate section, a probe means is carried by the top section at an outer end thereof including a pivotally-mounted arm having a switch and carrying a detecting blade which is movable outwardly by pivoting of the arm and upon encountering an obstruction engages the switch for operation thereof. A roller on the intermediate section of the fork mechanism is positioned in line with an end of the arm whereby upon relative movement between the top and intermediate sections the arm is caused to pivot and with the arm returning to retracted position once the arm moves past the roller. The arm has a cam member at the end thereof to cam the movable roller out of blocking relation upon return of the fork sections to nested position to restore the parts to position awaiting the next extending cycle of the shuttle fork mechanism.

Another feature of the invention is to provide probe means for detecting a load in a storage bin wherein the probe means maay be operated in a plurality of detecting cycles in the advance of the shuttle fork mechanism, when stored loads are disposed one behind the other in the storage bin and, further, to provide for selective deactivation of the probe means when desired.

BRIEF DESCRIPTION OF THE DRAWINGS

FIG. 1 is a diagrammatic view of the shuttle fork mechanism shown in extended position;

FIG. 2 is a fragmentary end elevational view of the top and intermediate fork sections of the shuttle fork mechanism shown in FIG. 1 and looking toward the right-hand end of FIG. 1;

FIG. 3 is a side elevational view of the same structure as shown in FIG. 2 and looking toward the left of FIG. 2;

FIG. 4 is a fragmentary plan section, taken generally along the line 4—4 in FIG. 3;

FIG. 5 is a view of the structure shown in FIG. 4 and with the probe means shown just short of fully extended position; and FIG. 6 is a plan section, similar to FIG. 5, of an alternate embodiment of the invention.

DESCRIPTION OF THE PREFERRED EMBODIMENTS

The shuttle fork mechanism is shown generally in FIG. 1. This structure is generally known and a specific example of the structure shown in FIG. 1 is shown in French Pat. No. 1,549,568, issued in France on Nov. 4, 1960. The shuttle fork mechanism includes a base section 10, an intermediate section 11, and a top section 12. The base section 10 has a gear rack 15 for coaction with one or the other of a pair of gears 16 and 17 which rotate in the same direction but are driven in one direction or the other depending upon the direction in which the shuttle fork mechanism is to be extended. A cable system including cables 20 and 21 is connected between the base section 10 at 22 and 23 and the top section at 24 and 25, with passage of the cables about guide rollers 26 and 27 on the intermediate section whereby movement of the intermediate section 11 results in movement of the top section 12 in the same direction at twice the rate of speed. This results in extension of the top section 12 a distance twice as great as that of the extension of the intermediate section 11. It is believed that the foregoing provides a sufficient understanding of the general structure of the shuttle fork mechanism and the disclosure of the French patent referred to above is incorporated herein by reference.

When the shuttle fork mechanism is retracted, the intermediate section 11 and top section 12 are in nested relation and generally overlie the base section 10 whereby the shuttle fork mechanism, which can be mounted on the frame of a stacker crane, may travel along an aisle of storage racks. When the shuttle fork mechanism reaches the appropriate storage rack, the shuttle fork mechanism can be extended. When the shuttle fork mechanism is entering a rack to pick up a load, the shuttle fork mechanism goes in at a relatively low level to pass under a pallet or other structure supporting a load and then the shuttle fork mechanism is raised slightly to lift the pallet off supports in the storage rack and to withdraw the load from the storage rack. When the shuttle fork mechanism is to be operated to deposit a load, the shuttle fork mechanism is at a relatively higher level so that the load can be carried into the storage rack and the shuttle fork mechanism is then slightly lowered to place the load on supports within the storage rack and the shuttle fork mechanism is then retracted. The invention embodied herein has to do with probe means effectively operable when the shuttle fork mechanism is at the relatively higher level to deposit a load to detect any possible obstruction in the storage rack to the advance of the shuttle fork mechanism.

The probe means, as shown particularly in FIGS. 2 to 5, embodies structure positioned between the top fork section 12 and the intermediate fork section 11 with parts carried on both of these fork sections. More particularly, the underside of the top section 12 had a mounting plate 30 which carries, on its underside, a pivoted arm 31 pivoted to the mounting plate 30 by a pivot mounting member 31a. The pivoted arm 31 has a switch member 32 mounted thereon with an actuating element 33 positioned adjacent a blade member 34 mounted to the arm 31 by a series of fastening elements 35, shown particularly in FIG. 2. The blade member 34 includes a vertically-extending element 36 spanning substantially the entire distance between the top section 12 and the intermediate section 11 whereby a substantial vertical space dimension is checked for possible obstruction. The pivoted arm 31 and the blade member 34 are shown in retracted position in FIG. 4 when the shuttle fork mechanism is in nested relation. The blade member 34 is shown substantially fully extended in FIG. 5 wherein the blade member has moved in an arc of movement with a sweeping action to scan a space in advance of the fork mechanism to detect any possible obstruction.

The movement of the probe means to scan for an obstruction is mechanically derived from relative movement between the intermediate section 11 and top section 12 by means of an actuating roller 40 mounted for pivotal movement on an arm 41 pivoted at 42 to the intermediate section by attachment to a plate 43 carried on the intermediate section 11. As shown in FIG. 4, the actuating roller 40 has an operative position as determined by engagement of the roller mounting arm 41 with an adjustable stop 45 carried on the plate 43 and with the arm urged against the adjustable stop by a spring 46 connected between the arm and a pin 47 on the plate 43. In this position of the atuating roller 40, it lies in the path of an end 50 of the pivoted arm 31 and to one side of the pivot mounting 31a of the pivoted arm. Upon extension of the shuttle fork mechanism, the top section 12 moves faster and through a greater distance than the intermediate section 11 whereby there is relative movement between these two sections which advances the pivoted arm 31 relative to the actuating roller 40 and to a position shown in FIG. 5. This progressively moves the blade member 34 through an arc to scan a spaced ahead of the shuttle fork mechanism. If the blade member encounters an obstruction, this will result in relative movement of the blade member 34 relative to the pivoted arm 31 to actuate the switch 32. The switch 32 is in a suitable circuit to cause discontinuance of the drive for extending the shuttle fork mechanism.

As the top section of the fork mechanism 12 moves slightly further to the right from the position shown in FIG. 5, the pivoted arm 31 will entirely clear the actuating roller 40. When this occurs, the pivoted arm 31 and the structure carried thereby return to a retracted position. This is caused by a spring 60 connected between a bracket 61 on mounting plate 30 and a bracket 62 on the pivoted arm 31. The return position is defined by an adjustable stop 63 extending downwardly from the plate 30 which engages the pivoted arm 31, as shown in FIG. 4. In order to prevent any inadvertent action of the switch 32 upon return of the pivoted arm 31 to retracted position, there is an added adjustable stop 64 fixed to and extending downwardly from the mounting plate 30 which, as shown in FIG. 4, engages the blade member 34 to prevent any whip action of the blade member 34 in return of the probe structure to retracted position. The foregoing has described the return of the blade member 34 to retracted position which occurs before final extension of the shuttle fork mechanism. This assures that there is no contact of the probe structure with the back interior structure of a stroage rack.

Upon return movement of the shuttle fork mechanism from the fully extended position shown in FIG. 1 and shortly prior to the fork sections returning to fully nested position, a cam surface 70 on the end 50 of the pivoted arm 31 engages the actuating roller 40 to swing the actuating roller 40 about the pivot 42 in a clockwise direction as viewed in FIG. 4 to permit passage of the pivoted arm 31 past the actuating roller 40. Once the pivoted arm 31 is moved past the actuating roller 40, the actuating roller 40 is returned to a position as determined by the adjustable stop 45 under the urging of the spring 46. The parts are then again positioned as shown in FIG. 4 for operation in the next extension of the shuttle fork mechanism.

The probe means disclosed herein can be mounted one at each end of the top section 12 of the fork mechanism, whereby the detection of an obstruction can be obtained in either direction of extension of the shuttle fork mechanism. With the structure disclosed herein, the probe system is operative whenever the shuttle fork mechanism is extended because of the mechanical interaction between parts on the top section and intermediate section of the fork mechanism which automatically extend the probe upon initial extension of the fork mechanism. In this way, the probe mechanism may be positioned in retracted position fully within the confines of the shuttle mechanism but moved outwardly through a sweep pivotal motion for early detection of any obstruction that may lie in the path of the fork mechanism.

An alternate embodiment is shown in FIG. 6. The structure disclosed in FIG. 6, to the extent that it is the same as shown in the embodiments of FIGS. 1 and 5, is identified with the same reference numerals, with a prime affixed thereto.

The embodiment of FIG. 6 provides for a plurality of detecting cycles in the advance of the shuttle fork mechanism to detect the presence of stored loads positioned one behind the other in a storage bin. This embodiment also disclosed structure for selective deactivation of the probe means.

In the embodiment of FIG. 6, the probe means associated with the top section 12 of the fork mechanism is the same as that shown in the embodiment of FIGS. 1 to 5. Additionally, the actuating roller 40' and its associated structure, along with the mounting thereof on the intermediate fork section 11 are the same as shown in the embodiment of FIGS. 1 to 5.

The first detecting cycle in the embodiment of FIG. 6 occurs in the same manner as in the embodiment of FIGS. 1 to 5, with the pivoted arm 31' being pivoted by contact with the actuating roller 40'. This detecting cycle operates to determine the presence of a stored load in the front area of the storage bin. With a stored load disposed to the rear of the storage bin, a second detecting cycle is obtained by a link 100 pivotally-connected at 101 to the pivoted arm 31' and, at its other end, pivotally-connected at 102 to a pivoted member 103. The pivoted member 103 is pivotally-mounted to the underside of the top fork section 12 by a pivot pin 104. The pivoted member 103 has a shape comparable to one end of the pivoted arm 31' particularly with respect to the surfaces that coact with the actuating roller 40'. Thus, in the position shown in FIG. 6, the shuttle fork mechanism has extended to a position wherein the pivoted member 103 is in contact with the actuating roller 40' to cause pivoting of the pivoted arm 31' through the connecting link 100. Further extension of the shuttle fork mechanism carries the pivoted member 103 past the actuating roller 40' with the result that the spring 60' returns the blade member 34' to its inactive position and the spring 46' brings the actuating roller 40' to its normal position.

Upon return of the shuttle fork mechanism, a surface 105 of the pivoted member 103 cams the actuating roller 40' to a position to permit passage of the pivoted member 103 and a similar action occurs when the pivoted arm 31' returns past the actuating roller 40'.

It will be recognized that as many of the pivoted members 103 and connecting links 100 may be provided as required for the desired number of detecting cycles in advance of the shuttle fork mechanism.

Means are provided for preventing detecting cycles during advance of the shuttle fork mechanism or less than all of the detecting cycles. This means includes a structure associated with the actuating roller 40' to pivot it against the action of spring 46' to a position whereby it does not contact the pivoted arm 31' or the pivoted member 103. This structure includes a solenoid 110 mounted to the intermediate fork section 11 with its armature connected to a link 111 which is pivotally-connected to the roller mounting arm 41' by a pivot pin 112. A suitable control circuit having the solenoid 110 therein is provided to energize the solenoid 110 to pivot the roller mounting arm 41' in a clockwise direction as viewed in FIG. 6 whenever a detecting cycle of the probe means is not to occur.

I claim:

1. A shuttle fork mechanism for operation in association with a plurality of storage racks for insertion and removal of loads from said racks comprising, a base section, an intermediate section and a load-supporting top section mounted for movement relative to said base section, means for extending said intermediate and top sections relative to the base section with the top section moving relative to the intermediate section, movable means carried by and at the outer end of the top section for detecting the presence of an obstruction in a storage rack, and means operable in response to movement of the top section relative to the intermediate section for temporarily moving said detecting means to a detecting position extending outwardly from the top section.

2. A shuttle fork mechanism as defined in claim 1 wherein said detecting means includes a pivoted arm carrying a switch, and a detector blade mounted on said pivoted arm in a position to operate said switch when an obstruction is encountered.

3. A shuttle fork mechanism as defined in claim 1 wherein said detecting means includes a pivoted arm mounted on said top section and an actuator on said intermediate section which engages and pivots said arm as the top section moves relative to the intermediate section.

4. A shuttle fork mechanism as defined in claim 3 wherein there is engagement of said pivoted arm with said actuator during only the initial part of the movement of the top section, and means for returning said pivoted arm to a retracted position after the pivoted arm no longer engages the actuator.

5. A shuttle fork mechanism as defined in claim 4 wherein said pivoted arm carries a switch and a deflectable switch operating blade for encountering an obstruction.

6. A shuttle fork mechanism having probe means for detecting an obstruction to movement of the mechanism comprising, a base section of the fork mechanism, an intermediate section and a load-supporting top section of the fork mechanism, means mounting the intermediate section and the top section for movement relative to the base and to each other, said probe means including detector means pivotally mounted on said top section, and means responsive to movement of the top section relative to the intermediate section to pivotally swing said detector means outwardly in an arc to scan a substantial distance ahead of said top section.

7. A shuttle fork mechanism as defined in claim 6 wherein said detector means includes an arm pivoted to said top section, a switch on said arm and a blade carried on said arm in position to operate said switch when an obstruction is encountered.

8. A shuttle fork mechanism as defined in claim 7 wherein said means for pivotally swinging said detector means includes a pivotally mounted roller on said intermediate section which engages and pivots said arm in response to said relative movement, and a cam surface on said arm to move said roller and permit movement of said arm therepast on return movement of said top section.

9. A shuttle fork mechanism as defined in claim 8 and having a spring connected to said arm to return said arm inwardly to its retracted position, and means to prevent operation of the switch by the blade when said arm is moved to its retracted position.

10. A shuttle fork mechanism for operation in association with a plurality of storage racks for insertion and removal of loads from said racks comprising, a base section, an intermediate section and a load-supporting top section having a nested relation in retracted position and movable relative to the base section to an extended position, means for extending said intermediate and top sections relative to the base section with the top section moving relative to the intermediate section, probe means pivotally carried on the top section and operative upon extending of the top section to sweep through an arc and detect any obstruction in the path of the top section, and interengaging means on the top and intermediate sections operative upon relative movement therebetween to cause the sweeping movement of said probe means.

11. A shuttle fork mechanism as defined in claim 10 wherein the probe means includes a pivoted arm, a pivotally mounted roller on said intermediate section positioned adjacent an end of said arm and defining therewith said interengaging means, movement of said top section causing pivoting of said arm until the arm is carried past said roller, spring means for returning said arm to retracted position, and cam means on said arm to move said roller out of the way as the top section returns to retracted position.

12. A shuttle fork mechanism as defined in claim 11 and including means selectively operable to pivot said roller away from a position to engage said arm to deactivate the probe means.

13. A shuttle fork mechanism for operation in association with a plurality of storage racks for insertion and removal of loads from said racks comprising, a base section, an intermediate section, and a top section mounted for movement relative to said base section, means for extending said intermediate and top sections relative to the base section with the top section moving relative to the intermediate section, movable means at the outer end of the top section for detecting the presence of an obstruction in a storage rack, and means operable in response to movement of the top section relative to the intermediate section for twice moving said detecting means to a detecting position extending outwardly from the top section in at least two different positions of extension of said top section.

14. A shuttle fork mechanism as defined in claim 13 wherein said detecting means includes a movable arm mounted on said top section and an actuator on said intermediate section which engages and moves said arm as the top section moves relative to the intermediate section, and a linkage connected to said arm including a member engageable with said actuator to cause a second movement of said arm.

15. A shuttle fork mechanism as defined in claim 14 wherein said actuator is movably mounted and means for shifting said actuator to a position wherein said arm does not engage the actuator and the detecting means is inoperative.

16. A shuttle fork mechanism for operation in association with a plurality of storage racks for insertion and removal of loads from said racks comprising, a base section, an intermediate section and a top section having a nested relation in retracted position and movable relative to the base section to an extended position, means for extending said intermediate and top sections relative to the base section with the top section moving relative to the intermediate section, probe means including a pivoted arm carried on the top section, a pivotally mounted roller on said intermediate section positioned adjacent an end of said pivoted arm for interengagement therewith upon extension of said top section to cause pivoting of said arm in a detecting cycle until the arm is carried past the roller, and means for causing a second detecting cycle of said arm including a pivoted member mounted on said top section at a distance from said pivoted arm and in position to engage said roller after partial extension of said top section, and means connecting said pivoted member to said pivoted arm whereby pivoting of said pivoted member causes said pivoted arm to move in a detecting cycle.

17. A shuttle fork mechanism for operation in association with a plurality of storage racks for insertion and removal of loads from said racks comprising, a first section and a load-supporting top section having a nested relation in retracted position and with the top section movable relative to the first section to an extended position, means for extending said top section relative to the first section, probe means pivotally carried on the top section and operative upon extending of the top section to both advance and sweep through an arc and detect any obstruction in the path of the top section, and interengaging means on the top and first sections operative upon relative movement therebetween to cause pivoting and thereby the sweeping movement of said probe means.

18. A shuttle fork mechanism as defined in claim 17 wherein the probe means includes a pivoted arm, a yieldable member on said first section positioned adjacent an end of said arm and defining therewith said interengaging means, movement of said top section causing pivoting of said arm until the arm is carried past said member, means for returning said arm to retracted position, and cam means on said arm to move said member out of the way as the top section returns to retracted position.

* * * * *